US010027590B2

(12) United States Patent
Sinha et al.

(10) Patent No.: US 10,027,590 B2
(45) Date of Patent: Jul. 17, 2018

(54) END TO END FLOW CONTROL

(71) Applicant: BROADCOM CORPORATION, Irvine, CA (US)

(72) Inventors: Santanu Sinha, Cupertino, CA (US); Mohan Venkatachar Kalkunte, Saratoga, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 47 days.

(21) Appl. No.: 14/628,173

(22) Filed: Feb. 20, 2015

(65) Prior Publication Data
US 2015/0244629 A1 Aug. 27, 2015

Related U.S. Application Data

(60) Provisional application No. 61/943,976, filed on Feb. 24, 2014.

(51) Int. Cl.
*H04L 12/801* (2013.01)
*H04L 12/931* (2013.01)
(Continued)

(52) U.S. Cl.
CPC .............. *H04L 47/18* (2013.01); *H04L 49/30* (2013.01); *H04L 49/45* (2013.01); *H04L 49/50* (2013.01);
(Continued)

(58) Field of Classification Search
None
See application file for complete search history.

(56) References Cited

U.S. PATENT DOCUMENTS 6,385,198 B1 * 5/2002 Ofek .................. H04L 12/5695
370/389
6,618,357 B1 * 9/2003 Geyer .................... H04L 29/06
370/236

(Continued)

FOREIGN PATENT DOCUMENTS

CN          1689278 A     10/2005

OTHER PUBLICATIONS

European Office Action from European Patent Application No. 15000531.2, dated Oct. 9, 2017, 11 pages.

*Primary Examiner* — James P Duffy
(74) *Attorney, Agent, or Firm* — McDermott Will & Emery LLP

(57) ABSTRACT

A network device implementing the subject system for end to end flow control may include at least one processor circuit that may be configured to detect that congestion is being experienced by at least one queue of a port and identify another network device that is transmitting downstream traffic being queued at the at least one queue of the port that is at least partially causing the congestion. The at least one processor circuit may be further configured to generate an end to end flow control message that comprises an identifier of the port, the end to end flow control message indicating that the downstream traffic should be flow controlled at the another network device. The at least one processor circuit may be further configured to transmit, out-of-band and through at least one intermediary network device, the end to end flow control message to the another network device.

20 Claims, 7 Drawing Sheets

(51) Int. Cl.
*H04L 12/935* (2013.01)
*H04L 12/803* (2013.01)
*H04L 12/841* (2013.01)

(52) U.S. Cl.
CPC ............ *H04L 47/122* (2013.01); *H04L 47/28* (2013.01); *H04L 49/506* (2013.01); *H04L 49/508* (2013.01)

(56) References Cited

U.S. PATENT DOCUMENTS

| | | |
|---|---|---|
| 7,596,627 B2 | 9/2009 | Cometto et al. |
| 7,668,103 B1 | 2/2010 | Pannell et al. |
| 7,675,857 B1 | 3/2010 | Chesson |
| 7,706,255 B1 | 4/2010 | Kondrat et al. |
| 8,811,183 B1 * | 8/2014 | Anand ................ H04L 49/1515 370/237 |
| 2002/0136163 A1 * | 9/2002 | Kawakami .............. H04L 47/26 370/229 |
| 2006/0104298 A1 | 5/2006 | McAlpine et al. |
| 2006/0215550 A1 | 9/2006 | Malhotra |
| 2007/0047535 A1 * | 3/2007 | Varma .................... H04L 47/10 370/360 |
| 2008/0259798 A1 | 10/2008 | Loh et al. |
| 2010/0061241 A1 | 3/2010 | Sindhu et al. |
| 2012/0275301 A1 * | 11/2012 | Xiong ................... H04L 49/357 370/230 |
| 2014/0044129 A1 * | 2/2014 | Mentze ................ H04L 49/354 370/390 |
| 2014/0086098 A1 * | 3/2014 | Ao .......................... H04L 41/12 370/254 |

* cited by examiner

END TO END FLOW CONTROL

CROSS-REFERENCE TO RELATED APPLICATIONS

The present application claims the benefit of U.S. Provisional Patent Application Ser. No. 61/943,976, entitled "End to End Flow Control," filed on Feb. 24, 2014, which is hereby incorporated by reference in its entirety for all purposes.

TECHNICAL FIELD

The present description relates generally to flow control in a network environment, and including end to end flow control in a network environment.

BACKGROUND

An extended bridge network deployment may be, for example, an Ethernet network deployment where end stations are connected to a switch device that is referred to as a port extender device. A port extender device may not perform bridging functions; instead, the port extender device may forward all incoming packets to a controlling bridge device that performs bridging functions for all connected port extender devices. In this manner, the forwarding and enforcement of security policies for the network environment can be centralized at the controlling bridge.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

Figure 1:
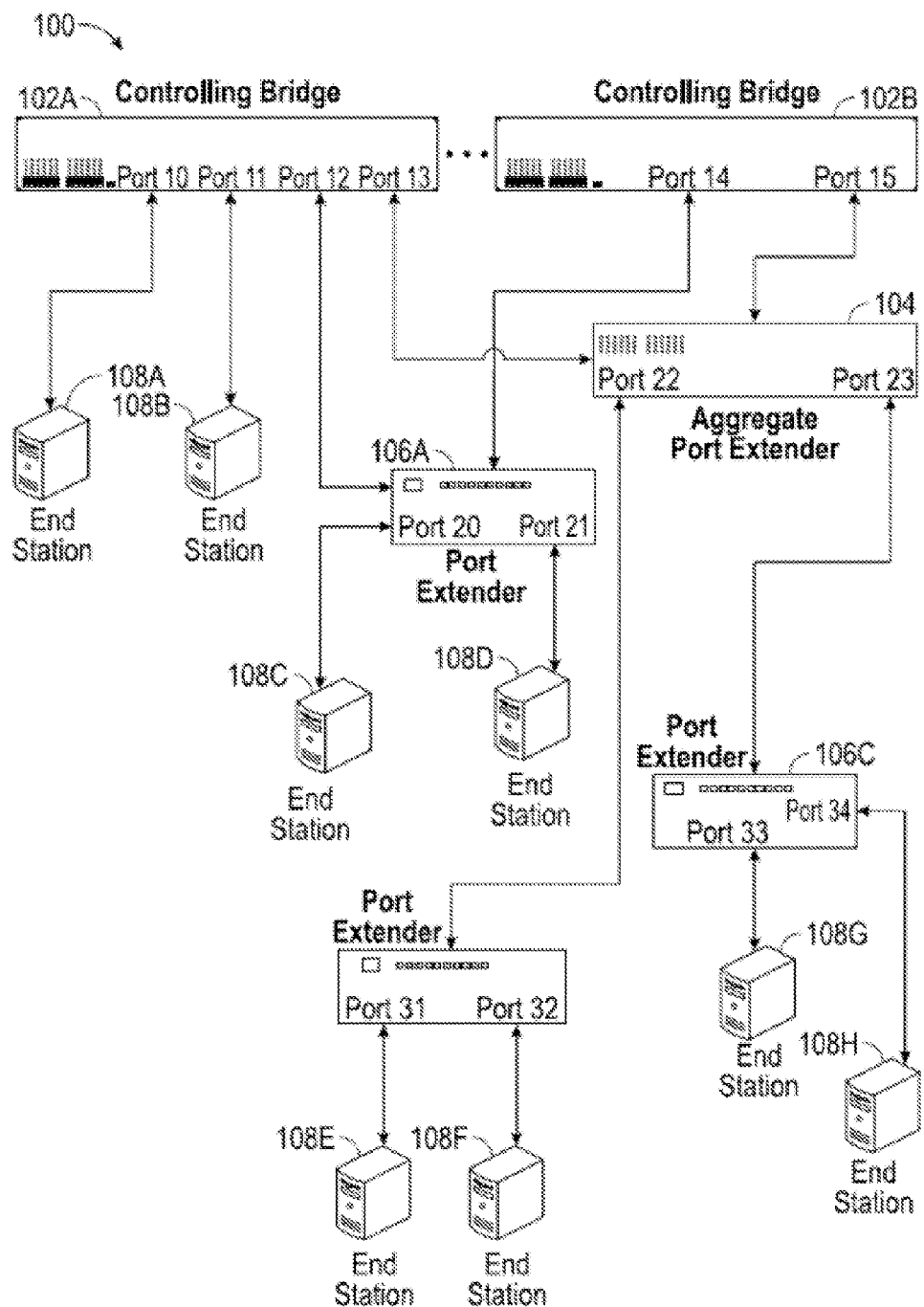
FIG. 1 illustrates an example network environment in which a system for end to end flow control may be implemented in accordance with one or more implementations.

FIG. 1 illustrates an example network environment 100 in which a system for end to end flow control can be implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 100 includes one or more controlling bridge devices 102A-B, one or more aggregate port extender devices 104, one or more port extender devices 106A-C, and one or more end station devices 108A-H. One or more of the devices 102A-B, 104, 106A-C, 108A-H may be and/or may include all or part of the electronic system discussed below with respect to FIG. 7. In one or more implementations, one or more of the controlling bridge devices 102A-B, the aggregate port extender device 104, and/or the port extender devices 106A-C are referred to as network devices and may be, and/or may include switch devices. In one or more implementations, one or more of the end station devices 108A-H are also be referred to as network devices.

In one or more implementations, the devices 102A-B, 104, 106A-C, 108A-H are communicatively coupled, as shown by the solid lines in FIG. 1, by one or more Ethernet links. In one or more implementations, the controlling bridge devices 102A-B is further coupled to an uplink, such as to the Internet. The arrangement of the devices 102A-B, 104, 106A-C, 108A-H in the network environment 100 may be referred to as an extended bridge, or an extended bridge architecture. The controlling bridge devices 102A-B may make forwarding decisions in the network environment 100, although local forwarding may also be performed by the port extender devices 106A-C and/or the aggregate port extender device 104. In one or more implementations, the network environment 100 includes multiple controlling bridge devices 102A-B, such as for redundancy and/or load balancing purposes. Frame forwarding mechanisms and frame formats utilized in the extended bridge architecture of the network environment 100 may be provided by a standard, such as the Institute of Electrical and Electronics Engineers (IEEE) 802.1BR-2012 standard.

The end station devices 108A-H are devices that are sources or destinations of network traffic flow in the network environment 100. The end station devices 108A-H can be computing devices such as laptop or desktop computers, router devices, smartphones, set-top boxes, tablet computers, televisions or other displays with one or more processors coupled thereto and/or embedded therein, or other appropriate computing devices that can be used for receiving and/or transmitting data, and/or can be coupled to such a device. In the example of FIG. 1, the end station devices 108A-H are depicted as server devices.

The port extender devices 106A-C do not perform bridging functions and instead forward incoming packets to one or more of the controlling bridge devices 102A-B that performs the bridging functions on behalf of the port extender devices 106A-C. The aggregate port extender device 104, which may also be referred to as an intermediary network device, is a port extender device that connects to one or more other port extender devices 106A-C. Similar to the port extender devices 106A-C, the aggregate port extender device 104 does not perform any bridging functions and instead forwards incoming packets to one or more of the controlling bridge devices 102A-B that perform bridging functions on behalf of the aggregate port extender device 104. In one or more implementations, packet forwarding is performed by one or more of the port extender devices 106A-C and/or the aggregate port extender device 104 without modifying the packets.

The controlling bridge devices 102A-B may include several local ports, some of which may directly couple the controlling bridge devices 102A-B to one or more of the end station devices 108A-B, such as ports 10 and 11 of the controlling bridge device 102A which are directly coupled to the end station devices 108A-B, respectively. In one or more implementations, one or more of the controlling bridge devices 102A-B are indirectly coupled to one or more of the end station devices 108C-H through the ports of one or more of the port extender devices 106A-C. For example, end station devices 108C-D are coupled to ports 20 and 21, respectively, of the port extender device 106A, and the port extender device 106A is coupled to port 12 of the controlling bridge device 102A and port 14 of the controlling bridge device 102B. In one or more implementations, the controlling bridge devices 102A-B store network information, such as a topology, corresponding to the network environment 100, such that the controlling bridge devices 102A-B can determine the ports of the port extender devices 106A-C to which the end station devices 108A-H are connected.

In one or more implementations, one or more of the controlling bridge devices 102A-B may be indirectly coupled to one or more of the end station devices 108C-H through a tree of port extender devices 106A-C and/or one or more aggregate port extender devices 104, such as the end station devices 108E-F that are connected to port 13 of the controlling bridge device 102A and port 15 of the controlling bridge device 102B, through port 22 of the aggregate port extender device 104, and ports 31 and 32, respectively, of the port extender device 106B. Similarly, the end station devices 108G-H are coupled to port 13 of the controlling bridge device 102A and port 15 of the controlling bridge device 102B, through port 23 of the aggregate port extender device 104, and ports 33 and 34, respectively, of the port extender device 106C.

The ports of the controlling bridge devices 102A-B, the port extender devices 106A-C and/or the aggregate port extender device 104 that are directly coupled to end station devices 108A-H are referred to as extended ports. Thus, in the network environment 100, ports 10, 11, 20, 21, and 31-34 are extended ports. The ports of the controlling bridge devices 102A-B and/or the aggregate port extender device 104 that are directly coupled to one or more of the port extender devices 106A-C are referred to as cascaded ports. Thus, in the network environment 100, ports 12, 13, 22, and 23 are cascaded ports.

In one or more implementations, one or more of the devices 102A-B, 104, 106A-C, 108A-H may implement a hop-by-hop link level priority flow control (PFC) mechanism supported in the IEEE 802.1BR-2012 standard. In a hop-by-hop flow control scheme, congestion may build up at each hop, may spread to the next hop, and the process may continue for flow control to propagate from an end station device 108H to a controlling bridge device 102A, and vice versa. While congestion propagates through one or more of the port extender devices 106A-C and/or the aggregate port extender device 104, queues may build up at one or more of the port extender devices 106A-C, the aggregate port extender device 104, and/or one or more of the controlling bridge devices 102A-B, which may cause excessive packet transport latencies and potentially dropped packets. At each hop, a PFC message may carry flow control for up to eight traffic classes which may result in the pause of aggregate traffic to and/or from multiple sources in that traffic class. Thus, the link level PFC mechanism may result in head-of-line (HOL) blocking across one or more of the end station devices 108A-H.

In the network environment 100, congestion may occur at queues of any of the ports of the port extender devices 106A-C, the aggregate port extender device 104, and/or the controlling bridge devices 102A-B. In one or more implementations, an uplink port in the network environment 100 may have more bandwidth than any individual downlink port because the uplink aggregates traffic from several downlink ports. Thus, a burst of higher bandwidth downstream traffic from one or more of the controlling bridge devices 102A-B, and received through an uplink port in a port extender device 106A, for example, may cause temporary congestion at its lower bandwidth destination downlink port. In one or more implementations, in the upstream direction, the uplink port's bandwidth in the network environment 100 may be less than the total bandwidth of downlink ports, which may cause oversubscription. Thus, in the upstream direction congestion may occur at an oversubscribed uplink port because of simultaneous traffic from multiple downlink ports of one or more of the port extender devices 106A-C destined to one or more of the controlling bridge devices 102A-B. If the traffic continues to be bursty, congestion at the uplink port queues may persist. Upstream congestion is discussed further below with respect to FIG. 2, and downstream congestion is discussed further below with respect to FIG. 3.

In the subject system, an end-to-end flow control scheme is implemented that utilizes out-of-band Ethernet flow control messages that can co-exist with a standard hop-by-hop flow control scheme (e.g. PFC). The flow control message may be sent as a special Ethernet packet from a congestion point to a remote source to temporarily pause transmission of traffic to ease congestion. For example, such flow control messages can be sent by one or more of the port extender devices 106A-C to one or more of the controlling bridge devices 102A-B, and vice versa, in the network environment 100 and/or in an IEEE 802.1BR-2012 network environment, to reduce congestion. Thus, the proposed end-to-end flow control scheme can be overlaid on a standard IEEE 802.1BR-2012 compliant, proprietary, or any version of an extended bridge architecture. The subject system does not cause HOL blocking because it stops traffic flow causing congestion without affecting traffic from other sources.

In the subject system, one or more of the devices 102A-B, 104, 106A-C may monitor the occupancy of local queues by traffic source to identify when a queue is experiencing congestion, e.g. a congestion point. In one or more implementations, a congestion point may be a queue in one or more of the devices 102A-B, 104, 106A-C that is congested. A queue may be a physical queue or a logical queue. A physical queue in one or more of the devices 102A-B, 104, 106A-C may store packets received from one or more source devices that have one or more priorities (e.g. 802.1P priorities) and are waiting to be transmitted out of an Ethernet port. In one or more implementations, a logical queue may not store packets but may be a counter that keeps track of packets stored in the one or more devices 102A-B, 104, 106A-C from a logical entity, like a group of source devices in a group of priorities, and waiting to be transmitted. In one or more implementations, packets tracked in a logical queue may be stored in one or more physical queues.

Upon detecting congestion in a queue by one or more of the devices 102A-B, 104, 106A-C, the one or more of the devices 102A-B, 104, 106A-C dynamically identifies the source(s) that are causing the congestion. The one or more devices 102A-B, 104, 106A-C then sends out-of-band end to end flow control messages to each source device that has caused congestion in the queue, and/or to a single source device that is causing the majority of the congestion. Example processes of detecting congestion and transmitting end to end flow control messages are discussed further below with respect to FIGS. 4A and 5A. In one or more implementations, an end to end flow control message contains the following information to identify the flow that needs to be flow controlled: a number (e.g. e-Tag in 802.1BR) that uniquely identifies the source device, e.g. an identifier of the port that is experiencing congestion, and a list of priorities (e.g. 802.1P priorities) or a bit vector identifying all priorities that need to be flow controlled by the source device. An example end to end flow control message format is discussed further below with respect to FIG. 6.

The one or more devices 102A-B, 104, 106A-C, that is the destination of an end to end flow control message (e.g. a reaction point) may react to such a message by taking direct and/or indirect actions to reduce traffic with congested priorities. The direct actions may include rate limiting congested traffic, and indirect actions may include sending PFC messages to a link partner (e.g. one or more end station devices 108A-H) to pause traffic in the congested priorities. Example reaction processes of devices implementing the subject system are discussed further below with respect to FIGS. 4B and 5B.

Thus, in the subject system the end to end flow control messages are sent by one or more congested devices 102A-B, 104, 106A-C through the network environment 100 to the remote source of traffic directly, instead of spreading congestion through a series of link-level, hop-by-hop, flow control messages. Furthermore, in the subject system the traffic that is causing congestion is stopped by the source at a very early stage, thereby avoiding build up across the network environment 100 and dropped packets from other sources or to other destinations. Thus, the subject system not only avoids HOL blocking but also significantly reduces packet drops and latency issues.

Figure 2:
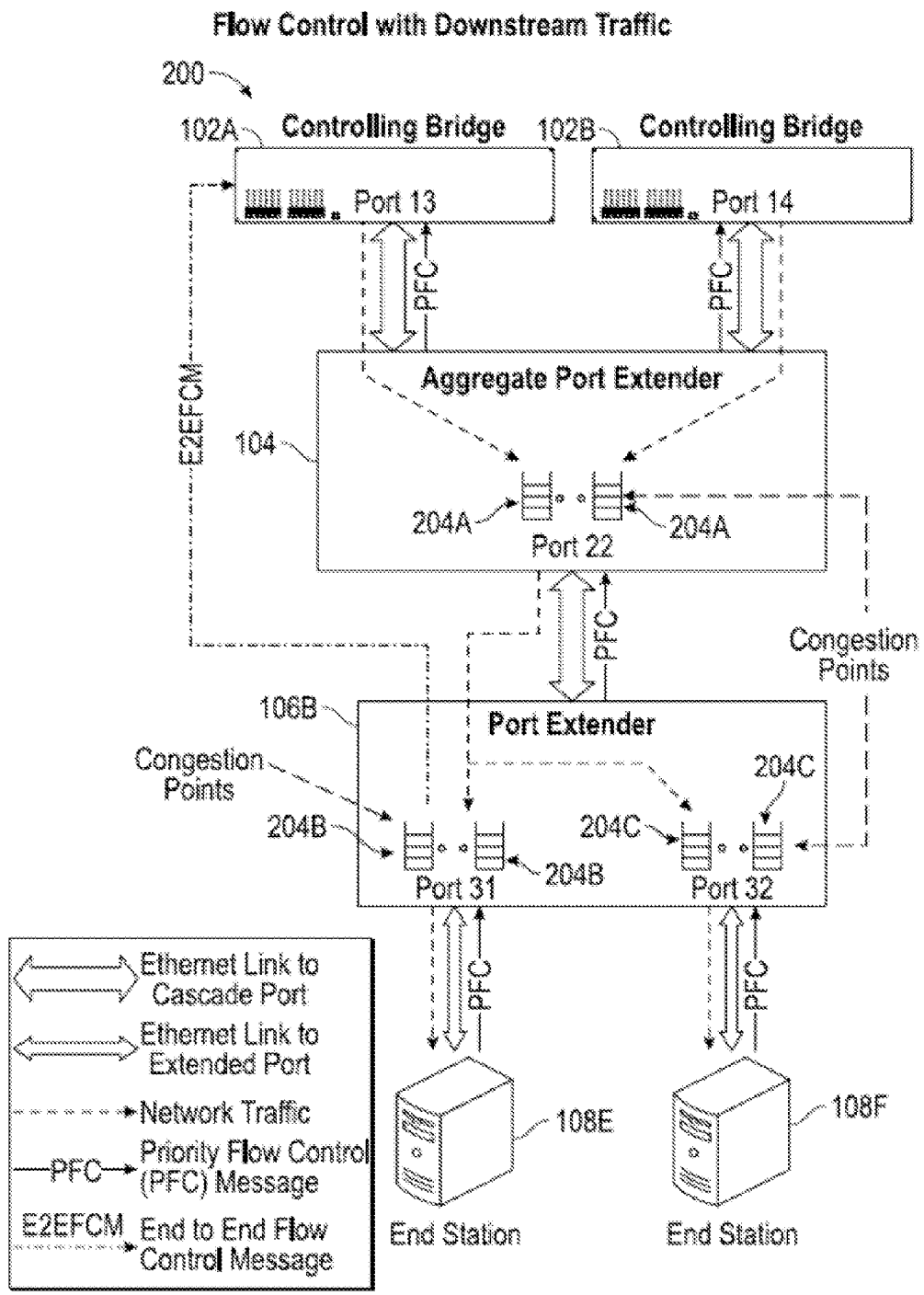
FIG. 2 illustrates an example network environment in which downstream end to end flow control is implemented in accordance with one or more implementations.

FIG. 2 illustrates an example network environment 200 in which downstream end to end flow control is implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 200 includes the controlling bridge devices 102A-B, the aggregate port extender device 104, the port extender device 106B, and the end station devices 108E-F. The devices 102A-B, 104, 106B, 108E-F are connected and/or coupled by one or more Ethernet links. The aggregate port extender device 104 includes one or more downstream queues 204A associated with port 22. The port extender device 106B includes one or more downstream queues 204B associated with port 31, and one or more downstream queues 204C associated with port 32. Each of the one or more downstream queues 204A-C may include separate queues for different classes and/or priorities of traffic, and each of the one or more downstream queues 204A-C may be referred to as congestion points.

In the downstream direction (controlling bridge devices 102A-B to end station devices 108A-H), the controlling bridge devices 102A-B transmit packets to the end station devices 108E-F through ports 13 and 14, respectively. The packets are received by the aggregate port extender device 104 and queued in the one or more downstream queues 204A for transmission to the port extender device 106B via port 22. The port extender device 106B receives the packets and queues the packets addressed to the end station device 108E in the one or more downstream queues 204B, and the packets addressed to the end station device 108F in the one or more downstream queues 204C. The packets queued in the one or more downstream queues 204B are then transmitted to the end station device 108E via port 31, and the packets queued in the one or more downstream queues 204C are transmitted to the end station device 108F via port 32.

Thus, in the downstream direction, the port extender device 106B receives traffic from one or more uplink cascaded ports, such as port 22 of the aggregate port extender device 104, destined to one or more downlink extended ports, such as ports 31 and 32 of the port extender device 106B. Similarly, the aggregate port extender device 104 receives traffic from tis one or more uplink cascaded ports, such as port 13 of the controlling bridge device 102A and/or port 14 of the controlling bridge device 102B, destined to the downlink cascaded ports of the aggregate port extender device 104, such as port 22.

Congestion may occur in the downstream direction at the aggregate port extender device 104 and/or the port extender device 106B for one or more reasons. For example, one or more of the end station devices, such as the end station device 108E, may not be able to process bursts of traffic it receives from the upstream port extender device 106B. As a result, the end station device 108E may send a PFC message (e.g. compliant with 802.1BR) to flow control one or more lower priorities so that it can continue receiving and processing higher priority traffic.

However, the port extender device 106B may also become congested either because it received the PFC message from the downlink end station device 108E (and stopped transmitting downlink traffic having the specified priorities to the downlink end station device 108E), and/or because it received a burst of traffic from an uplink aggregate port extender device 104 through a high bandwidth port, such as port 22, that is destined to the downlink end station device 108E. Congestion in the port extender device 106B may cause it to send PFC messages to the uplink aggregate port extender device 104 to flow control traffic in the congested priorities. The uplink aggregate port extender device 104 may similarly become congested (e.g. because it stopped transmitting downlink traffic having the specified priorities to the port extender device 106B in response to the PFC messages), and may send PFC messages to the controlling bridge device 102A. The controlling bridge device 102A may become congested either because it received bursts of downstream traffic destined to a particular downlink port extender device 106B and/or an aggregate port extender device 104, or because the downlink aggregate port extender device 104 sent the PFC message to the controlling bridge device 102A. Thus congestion in a downstream device, such as the end station device 108E, may spread through upstream devices 106B, 104, and eventually stop traffic in one or more of the controlling bridge devices 102A-B.

Furthermore, when the aggregate port extender device 104 and/or the port extender device 106B receives a PFC message, the devices 104,106B will pause all traffic in the flow controlled priorities, meaning that the devices 104, 106B will block traffic from sources responsible for congestion as well as traffic from sources that may not responsible for congestion. In addition, since PFC is a link-level control protocol, not end-to-end, it causes congestion to spread hop-by-hop. Thus, the downstream queues 204A-C in the port extender device 106B and the aggregate port extender device 104 in the affected priorities will build up at every hop. As a result, the packet propagation delays (latencies) in the congested priorities will be become higher and higher as congestion is spreading—affecting latency-sensitive traffic, such as web results in a data center.

In the subject system, the devices 104, 106B monitor occupancy of the one or more downstream queues 204A-C to determine when one of the downstream queues 204A-C is becoming congested. For example, the devices 104, 106B may include a set of counters, where each counter monitors an amount of traffic stored in each of the downstream queues 204A-C by source device (or groups of source devices) of the traffic and/or by priorities and/or traffic classes (or groups of traffic classes) of traffic from each source (or group of sources). A source device is a source of traffic that can be flow controlled by an end to end flow control message. The traffic classes may be standard 8 PFC traffic classes or may be any number of traffic classes greater than one, where each traffic class can be defined by arbitrary sets of policies that can be configured, managed, and/or enforced.

Thus, the port extender device 106B and the aggregate port extender device 104 can track traffic received in different priorities from one or more of the controlling bridge devices 102A-B by traffic classes (since each of the controlling bridge devices 102A-B is an endpoint source device for downstream traffic). In one or more implementations, traffic received from the controlling bridge devices 102A-B may be monitored by the devices 104, 106B individually or as groups.

For example, in the port extender device 106B, the traffic from the controlling bridge device 102A that is destined to the end station device 108E and is associated with a priority of 0 or 1 may be monitored or tracked in Group 1, the traffic from the controlling bridge device 102A that is destined to the end station device 108E and is associated with a priority of 3-5 may be monitored or tracked in Group 2, and the traffic from the controlling bridge device 102A that is destined to the end station device 108E and is associated with a priority of 6 or 7 may be monitored or tracked in Group 3. The traffic from the controlling bridge device 102A that is destined to the end station device 108F and is associated with a priority of 0 or 1 may be monitored or tracked in Group 4, the traffic from the controlling bridge device 102A that is destined to the end station device 108F and is associated with a priority of 3-5 may be monitored or tracked in Group 5, and the traffic from the controlling bridge device 102A that is destined to the end station device 108F and is associated with a priority of 6 or 7 may be monitored or tracked in Group 6.

When the port extender device 106B detects congestion with regard to the one or more downstream queues 204B associated with port 31, the port extender device 106B transmits an out-of-band end to end flow control message, through the aggregate port extender device 104, to the controlling bridge device 102A. The end to end flow control message includes the address of the port extender device 106B as the source media access control (MAC) address and the address of the controlling bridge device 102A as the destination MAC address. The end to end flow control message includes an identifier (e.g. a portId) that uniquely identifies the congested port of the port extender device 106B, e.g. port 31. In one or more implementations, the end to end flow control message may also include a list of one or more priorities (e.g. a priorities list) that identifies the priorities that should be flow controlled by the controlling bridge device 102A to reduce congestion at the identified port of the port extender device 106B. An example process of detecting downstream congestion and transmitting an end to end flow control message is discussed further below with respect to FIG. 4A.

When the controlling bridge device 102A receives the end to end flow control message, the packer parser of the controlling bridge device 102A extracts the identifier of the port (e.g. portId), the list of priorities (e.g. priorities list), and any time duration included in the message. The end to end flow control message indicates that the controlling bridge device 102A should stop traffic to a specific downlink port in the port extender device 106B, identified by the identifier of the port, in the priorities included in the priorities list. Thus, the controlling bridge device 102A maps the combination ({portId, priorities list}) to a physical queue that needs to stop sending downstream traffic in order to reduce congestion at port 31 of the port extender device 106B.

For example, the controlling bridge device 102A may pause or rate limit packets destined to end station device 108E through port 31 of the port extender device 106B that are associated with the priorities identified in the end to end flow control message. The controlling bridge device 102A may continue to pause or rate limit traffic for a pre-determined duration. In one or more implementations, the duration may be indicated in the end to end flow control message and/or the duration may be configured in the controlling bridge device 102A. For example, the port extender device 106B may estimate an amount of time required to relieve the congestion and may indicate the amount of time in the end to end flow control message. If the controlling bridge device 102A receives a second end to end flow control message from the port extender device 106B to flow control traffic destined to port 31 of the port extender device 106B, the controlling bridge device 102A may re-initialize the duration to one in the second message or the configured value in the controlling bridge device 102A. An example process of receiving an end to end flow control message and performing flow control in the downstream direction is discussed further below with respect to FIG. 4B.

In one or more implementations, the mechanism by which the traffic is stopped by the controlling bridge device 102A may vary. For example, the drain rate of the outbound queue may be controlled to either 0 (to totally stop transmitting), or to a smaller value (to reduce the rate of transmission). In such implementations the queue may build up if the ingress rate at which traffic is offered and stored in the queue is higher than the egress rate—limited by the maximum depth or allowed build up in the queue. However, in one or more other implementations the ingress offered rate or rate of storage in the queue is controlled to control the average drain rate of the queue at the controlling bridge device 102A.

Thus, the subject system allows the port extender device 106B, and/or the aggregate port extender device 104, to send a special end to end flow control message to control downstream traffic flow from one or more of the controlling bridge devices 102A-B in a specific traffic class, and allows the controlling bridge device 102A to stop traffic flow to a specific port in a specific traffic class in a port extender device 106B, and/or aggregate port extender device 104, without affecting any other traffic flow from any other source or any other priority.

In one or more implementations, one or more of the downstream queues 204A-C may be implemented in software (e.g., subroutines and code) and/or in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
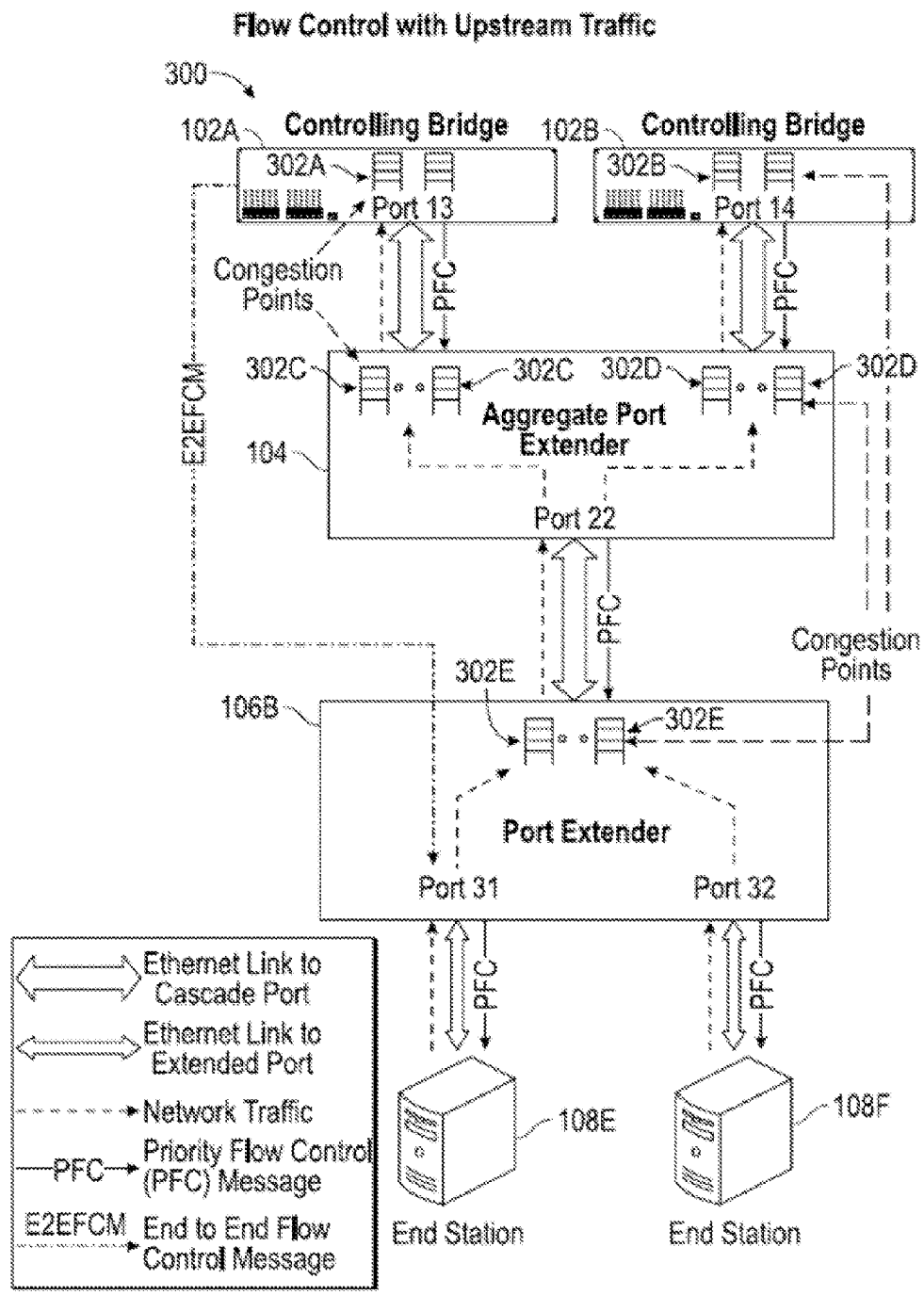
FIG. 3 illustrates an example network environment in which upstream end to end flow control is implemented in accordance with one or more implementations.

FIG. 3 illustrates an example network environment 300 in which upstream end to end flow control is implemented in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The network environment 300 includes the controlling bridge devices 102A-B, the aggregate port extender device 104, the port extender device 106B, and the end station devices 108E-F. The devices 102A-B, 104, 106B, 108E-F are connected and/or coupled by one or more Ethernet links. The controlling bridge device 102A includes one or more upstream queues 302A that queue upstream traffic from port 13 and the controlling bridge device 102B includes one or more upstream queues 302B that queue upstream traffic from port 14. The aggregate port extender device 104 includes one or more upstream queues 302C-D that queue upstream traffic from port 22 for transmission to port 13 of the controlling bridge device 102A and port 14 of the controlling bridge device 102B, respectively. The port extender device 106B includes one or more upstream queues 302E that queue upstream traffic from ports 31 and 32 for transmission to port 22 of the aggregate port extender device 104. Each of the one or more upstream queues 302A-D may include separate queues for different classes and/or priorities of traffic, and each of the one or more upstream queues 302A-D may be referred to as congestion points.

In the upstream direction (from the end station devices 108E-F to the controlling bridge devices 102A-B), the port extender device 106B aggregates traffic in the one or more upstream queues 302E from the downlink extended ports (e.g. ports 31-32), to the uplink cascaded port(s), e.g. port 22 of the aggregate port extender device 104. Similarly, the aggregate port extender device 104 aggregates traffic from its downlink ports, such as port 22, to the uplink cascaded port(s), e.g. port 13 of the controlling bridge device 102A and port 14 of the controlling bridge device 102B.

In the network environment 300, and/or an IEEE 802.1BR-2012 compliant extended bridge architecture, an upstream device may generate a PFC to the downstream device to reduce congestion for one or more reasons. For example, if a certain priority in the controlling bridge device 102A is oversubscribed, the controlling bridge device 102A will send PFC messages to pause traffic in that priority from all port extender devices and aggregate port extender devices 104 that are directly connected to the controlling bridge device 102A. If a certain priority in the aggregate port extender device 104 is oversubscribed, the aggregate port extender device 104 will send PFC messages to pause traffic in that priority from all port extender devices, such as the port extender device 106B, that are directly connected to the aggregate port extender device 104. If a certain priority in a port extender device, such as the port extender device 106B is oversubscribed, the port extender device 106B will send PFC messages to pause traffic in that priority from all end station devices 108E-F that are directly connected to the port extender device 106B, and that are sending traffic in the congested priorities.

Thus, if the controlling bridge device transmits PFC messages to the aggregate port extender device 104, the aggregate port extender device 104 will stop transmitting upstream traffic to the controlling bridge device 102A in the flow controlled priorities. The traffic in those priorities will then start building up in the one or more upstream queues 302C of the aggregate port extender device 104, which may trigger the aggregate port extender device 104 to transmit PFC messages to the port extender device 106B. The port extender device 106B will stop transmitting upstream traffic to the aggregate port extender device 104 in the flow controlled priorities, which may cause upstream traffic to build up in the one or more upstream queues 302E of the port extender device 106B. The buildup in the one or more upstream queues 302E of the port extender device 106B may cause the port extender device 106B to transmit PFC messages to the one or more end station devices 108E-F. Thus, the congestion in the upstream device, e.g. the controlling bridge device 102A, spread through downstream devices 104,106B, and eventually stops the upstream traffic at the end station devices 108E-F.

Furthermore, when the aggregate port extender device 104 and/or the port extender device 106B receives a PFC message, the devices 104,106B will pause all traffic in the flow controlled priorities, meaning that the devices 104, 106B will block traffic from sources responsible for congestion as well as traffic from sources that may not responsible for congestion. For example, in the upstream direction the controlling bridge device 102A aggregates traffic from all of the end station devices 108E-F. Thus, the controlling bridge device 102A may get congested because of traffic from one or more of the end station devices 108E-F. However, the controlling bridge device 102A may only be able to flow control traffic in one or more priorities (out of 8 identified in a PFC message, for example) from the downstream port extender device 106B and/or the downstream aggregate port extender device 104. Thus, PFC does not allow the controlling bridge device 102A to flow control the specific end station device, or groups of end station devices that may be specifically responsible for congestion in that priority. As a result, the PFC from the controlling bridge device 102A to the downstream port extender device 106B and the downstream aggregate port extender device 104, will not only pause traffic in that priority from one or more end station devices that may have caused the congestion, such as the end station device 108E, but will also pause traffic from one or more end station devices that may only have been sending light traffic in that priority and may not have caused congestion, such as the end station device 108F.

In the subject system, the devices 102A-B,104 monitor occupancy of the one or more upstream queues 302A-D to determine when one of the upstream queues 302A-D is becoming congested. The devices 102A-B,104 may utilize a set of counters, where each counter monitors an amount of traffic stored in each of the upstream queues 302A-D by source device (or groups of source devices) of the traffic and/or by priorities and/or traffic classes (or groups of traffic classes) of traffic from each source (or group of sources). For example, each of the controlling bridge devices 102A-B may have a set of counters to monitor traffic rates of each traffic class that is being received from the end station device 108E. The traffic rates from the end station device 108E may be monitored in each of the controlling bridge devices 102A-B, separately. In one or more implementations, traffic received from the end station devices 108E-F may be monitored individually, in groups, by 802.1P priority, and/or by groups of priorities (represented by a traffic class).

For example, in the controlling bridge device 102A, traffic received from the end station device 108E that is associated with a priority of 0 or 1 may be tracked in group 1, traffic received from the end station device 108E that is associated with a priority of 3-5 may be tracked in group 2, and traffic received from the end station device 108E that is associated with a priority of 6 or 7 may be tracked in group 3. Furthermore, traffic received from the end station device 108F that is associated with a priority of 0 or 1 may be tracked in group 4, traffic received from the end station device 108F that is associated with a priority of 3-5 may be tracked in group 5, and traffic received from the end station device 108F that is associated with a priority of 6 or 7 may be tracked in group 6.

When the controlling bridge device 102A detects congestion with regard to the upstream queues 302A that is being caused by traffic generated by the end station device 108E, an Ethernet end to end flow control message is sent by the controlling bridge device 102A, through the aggregate port extender device 104, to the port extender device 106B that is directly connected to the end station device 108E. The end to end flow control message includes the address of the controlling bridge device 102A as the source MAC address and the address of the port extender device 106B as the destination MAC address. The end to end flow control message includes an identifier of the port of the port extender device 106B (e.g. port 31) that needs to flow control the upstream traffic that is causing the congestion at the controlling bridge device 102A. In one or more implementations, the end to end flow control message may also include a list of priorities (or a priorities list) that identifies the priorities that should be flow controlled by the end station device 108E to reduce the congestion at the controlling bridge device 102A.

In one or more implementations, the end station device 108E may not be a network device that supports the end to end flow control messages. In this instance, the port extender device 106B terminates the end to end flow control message. Upon reception of the end to end flow control message, the port extender device 106B takes appropriate measures to reduce congestion at the controlling bridge device 102A. For example, the port extender device 106B extracts the identifier of the port and determines the end station device 108E that is connected to the port. The port extender device 106B may send a standard PFC message to the end station device 108E over the identified port, e.g. port 31, when the end station device 108E supports PFC. The port extender device 106B may map, or convert, the list of priorities from the end to end flow control message to a priority enable vector that is included in the PFC message. In one or more implementations, the port extender device 106B may copy or derive a value for the time field in the PFC message based at least in part on an amount of time included in the end to end flow control message.

Upon receiving the priority flow control message from the port extender device 106B, the end station device 108E will stop upstream traffic in the priorities listed in the priority enable vector of the message. Thus, the end station device 108E can flow control specific priorities reducing congestion at the controlling bridge device 102A without affecting traffic from any other end station device 108F, or in any other priority. The end station device 108E will continue to pause or stop that traffic for the duration indicated in the time field in the PFC message, unless it receives another PFC message from the port extender device 106B for the flow controlled priorities. The port extender device 106B may send another PFC message to the end station device 108E if congestion has not cleared at controlling bridge device 102A in the amount of time indicated in the end to end flow control message.

Thus, the subject system enables a controlling bridge device 102A to control the flow of upstream traffic from an end station device 108E by sending an end to end flow control message to a port extender device 106B that is either directly connected to the controlling bridge device 102A, or is connected to the controlling bridge device 102A through an aggregate port extender device 104. Furthermore, the end to end flow control Ethernet packets pass through the aggregate port extender device 104 as standard Ethernet packets, while the PFC packets are used for hop-by-hop flow control between the port extender device 106B and the end station devices 108E-F.

In one or more implementations, one or more of the upstream queues 302A-D may be implemented in software (e.g., subroutines and code) and/or in hardware (e.g., an ASIC, a FPGA, a PLD, a controller, a state machine, gated logic, discrete hardware components, or any other suitable devices) and/or a combination of both. Additional features and functions of these modules according to various aspects of the subject technology are further described in the present disclosure.

Figure 4A:
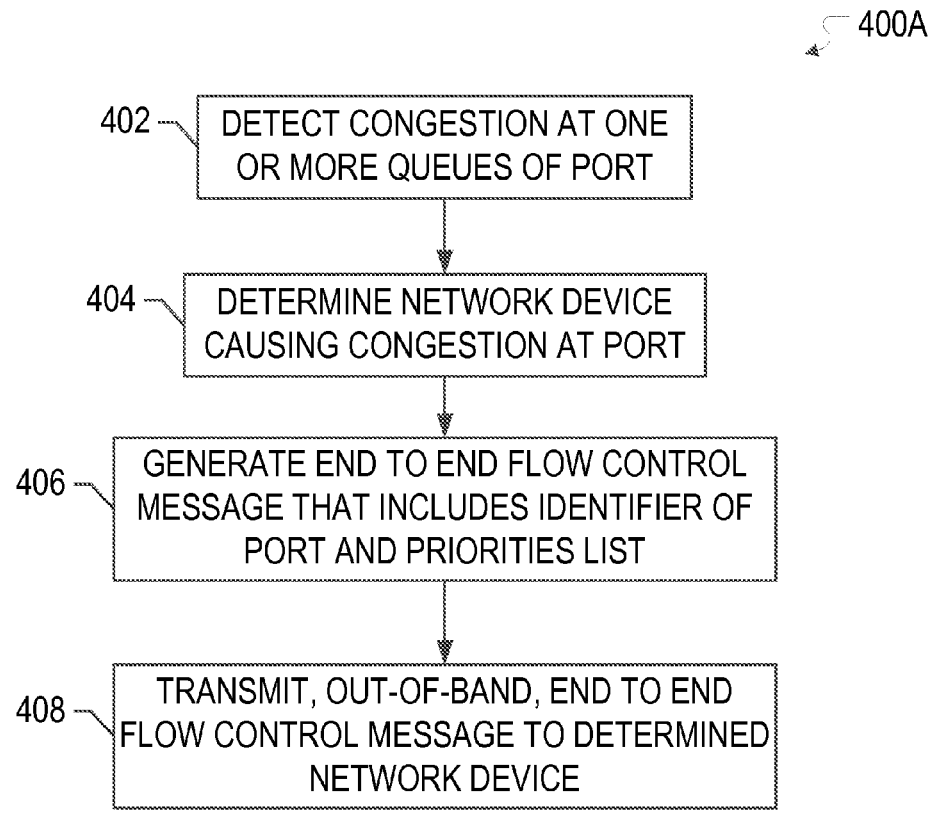
FIG. 4A illustrates a flow diagram of an example downstream end to end flow control initiation process in accordance with one or more implementations.

FIG. 4A illustrates a flow diagram of an example downstream end to end flow control initiation process 400A in accordance with one or more implementations. For explanatory purposes, the example process 400A is primarily described herein with reference to the port extender device 106B of FIGS. 1-3; however, the example process 400A is not limited to the port extender device 106B of FIGS. 1-3, e.g. the example process 400A may be performed by one or more of the port extender devices 106A,C, and/or the example process 400A may be performed by one or more components of the port extender device 106B. Further for explanatory purposes, the blocks of the example process 400A are described herein as occurring in serial, or linearly. However, multiple blocks of the example process 400A may occur in parallel. In addition, the blocks of the example process 400A may be performed in a different order than the order shown and/or one or more of the blocks of the example process 400A may not be performed.

The port extender device 106B detects congestion in one of the downstream queues 204B-C, such as the downstream queue 204B (402). For example, the port extender device 106B may compare a queue depth, or some other metric, to a threshold to determine that at least one of the one or more downstream queues 204B is experiencing congestion. The port extender device 106B determines the network device that is causing the congestion at the port, such as the controlling bridge device 102A (404). For example, the port extender device 106B may utilize counters to monitor a rate and/or amount of traffic (of different priorities and/or traffic classes) that is being queued in the one or more downstream queues 204B that is experiencing congestion. The network device that is causing the congestion may the network device that is transmitting the highest amount and/or highest rate of traffic (having the one or more priorities and/or traffic classes).

The port extender device 106B generates an end to end flow control message that includes an identifier of the port that is experiencing the congestion and a list of the priorities and/or traffic classes for which the downstream traffic should be flow controlled in order to relieve the congestion (406). The end to end flow control message may further include an address of the port extender device 106B as the source address and an address of the network device, such as the controlling bridge device 102A as the destination address. In one or more implementations, the port extender device 106B may estimate an amount of time that the traffic will need to be stopped in order to relieve the congestion of the one or more downstream queues 204B, e.g. based at least in part on one or more queue depths of the one or more downstream queues 204B and/or a rate at which packets are being transmitted from the one or more downstream queues 204B. The port extender device 106B may include the amount of time in the end to end flow control message.

The port extender device 106B transmits the end to end flow control message, out-of-band, to the determined network device, such as the controlling bridge device 102A (408). For example, the port extender device 106B may transmit the end to end flow control message to the aggregate port extender device 104, and the aggregate port extender device 104 may forward the end to end flow control message to the controlling bridge device 102A, without modifying the end to end flow control message. The port extender device 106B may monitor the depth of the one or more downstream queues 204B that are experiencing the congestion. If the congestion at the one or more downstream queues 204B is not relieved within the estimated amount of time, the port extender device 106B may transmit another end to end flow control message to the controlling bridge device 102A.

Figure 4B:
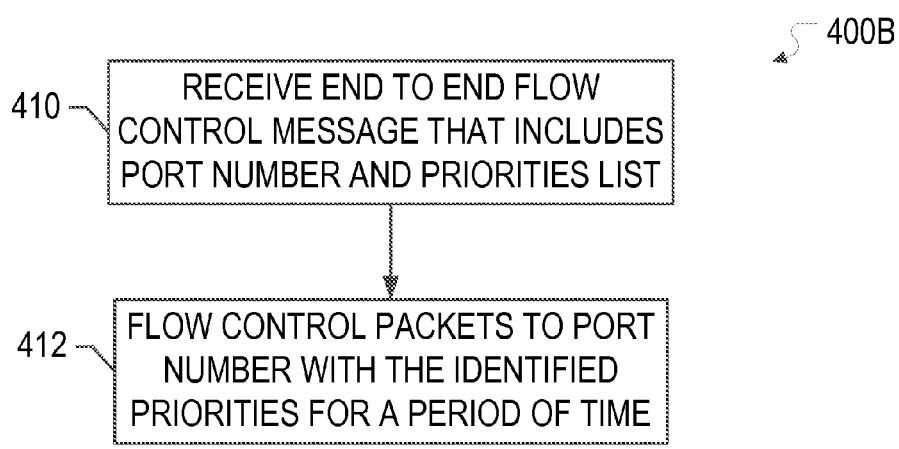
FIG. 4B illustrates a flow diagram of an example downstream end to end flow control reaction process in accordance with one or more implementations.

FIG. 4B illustrates a flow diagram of an example downstream end to end flow control reaction process 400B in accordance with one or more implementations. For explanatory purposes, the example process 400B is primarily described herein with reference to the controlling bridge device 102A of FIGS. 1-3; however, the example process 400B is not limited to the controlling bridge device 102A of FIGS. 1-3, e.g. the example process 400B may be performed by the controlling bridge device 102B, and/or the example process 400A may be performed by one or more components of the controlling bridge device 102A. Further for explanatory purposes, the blocks of the example process 400B are described herein as occurring in serial, or linearly. However, multiple blocks of the example process 400B may occur in parallel. In addition, the blocks of the example process 400B may be performed in a different order than the order shown and/or one or more of the blocks of the example process 400B may not be performed.

The controlling bridge device 102A receives an end to end flow control message from a downstream network device, such as the port extender device 106B, that includes a number of the port that is experiencing congestion at the downstream network device and a priorities list (410). In one or more implementations, the end to end flow control message may further include a duration of time.

The controlling bridge device 102A determines the downstream traffic that is being provided for transmission over the identified port, such as the downstream traffic that includes a destination address of the end station device 108E that is connected to the port, and the controlling bridge device 102A flow controls the determined downstream traffic associated with the priorities identified in the priorities list for a period of time (412). In one or more implementations, the period of time may be a duration of time that is configured by the controlling bridge device 102A and/or the period of time may be a duration of time that is identified in the end to end flow control message. The controlling bridge device 102A may continue to flow control the downstream traffic if another end to end flow control message is received.

Figure 5A:
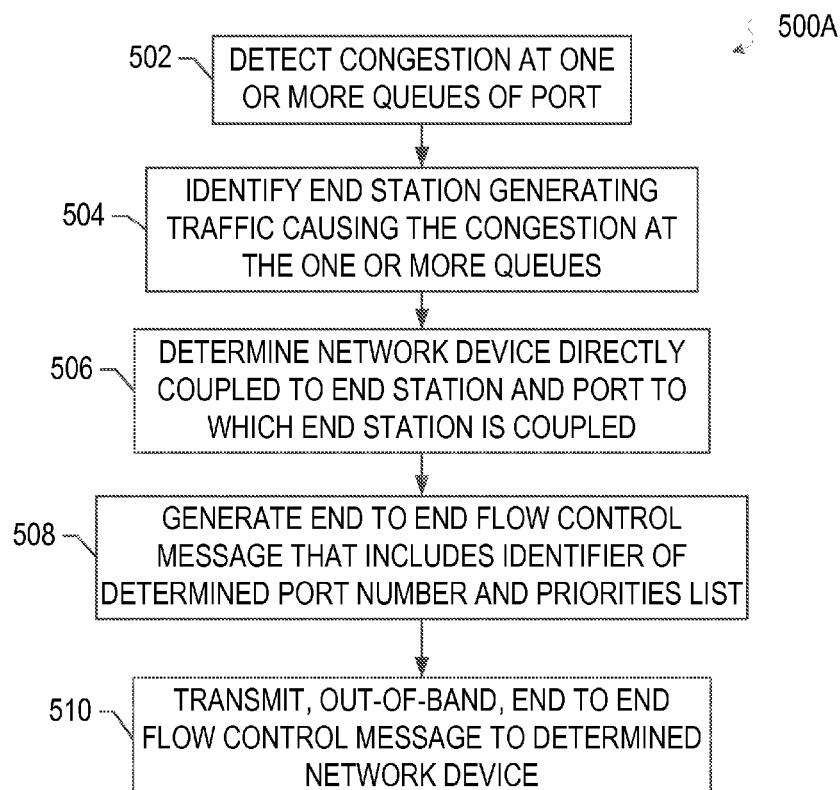
FIG. 5A illustrates a flow diagram of an example upstream end to end flow control initiation process in accordance with one or more implementations.

FIG. 5A illustrates a flow diagram of an example upstream end to end flow control initiation process 500A in accordance with one or more implementations. For explanatory purposes, the example process 500A is primarily described herein with reference to the controlling bridge device 102A of FIGS. 1-3; however, the example process 500A is not limited to the controlling bridge device 102A of FIGS. 1-3, e.g. the example process 500A may be performed by the controlling bridge device 102B, and/or the example process 500A may be performed by one or more components of the controlling bridge device 102A. Further for explanatory purposes, the blocks of the example process 500A are described herein as occurring in serial, or linearly. However, multiple blocks of the example process 500A may occur in parallel. In addition, the blocks of the example process 500A may be performed in a different order than the order shown and/or one or more of the blocks of the example process 500A may not be performed.

The controlling bridge device 102A detects congestion at one or more upstream queues 302A of a port (502). The controlling bridge device 102A identifies one or more of the end station devices 108A-H, such as the end station device 108E, that is generating the upstream traffic that is causing the congestion (504), such as based at least in part on the source address of the traffic. The controlling bridge device 102A determines the downstream network device that is directly coupled to the identified end station device 108E, such as the port extender device 106B (506). The controlling bridge device 102A generates an end to end flow control message that includes an identifier of the determined port at the port extender device 106B to which the identified end station device 108E is directly coupled and a list of priorities for which the upstream traffic should be flow controlled (508).

In one or more implementations, the controlling bridge device 102A may estimate an amount of time that the traffic will need to be stopped in order to relieve the congestion of the one or more upstream queues 302A, e.g. based at least in a part on one or more queue depths of the one or more upstream queues 302A and/or a rate at which packets are being transmitted from the one or more upstream queues 302B. The controlling bridge device 102A may include the amount of time in the end to end flow control message.

The controlling bridge device 102A transmits the end to end flow control message, out-of-band, to the determined network device, such as the port extender device 106B (510). For example, the controlling bridge device 102A may transmit the end to end flow control message to the aggregate port extender device 104, and the aggregate port extender device 104 may forward the end to end flow control message to the port extender device 106B, without modifying the end to end flow control message. The controlling bridge device 102A may monitor the depth of the one or more upstream queues 302A that are experiencing the congestion. If the congestion at the one or more upstream queues 302A is not relieved within the estimated amount of time, the controlling bridge device 102A may transmit another end to end flow control message to the port extender device 106B.

Figure 5B:
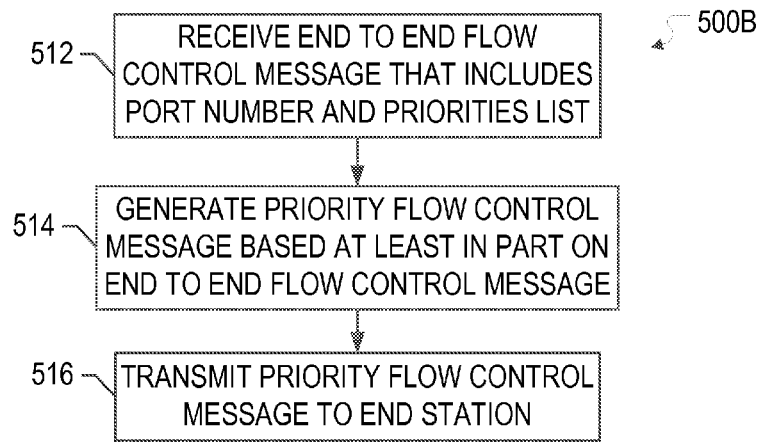
FIG. 5B illustrates a flow diagram of an example upstream end to end flow control reaction process in accordance with one or more implementations.

FIG. 5B illustrates a flow diagram of an example upstream end to end flow control reaction process 500B in accordance with one or more implementations. For explanatory purposes, the example process 500B is primarily described herein with reference to the port extender device 106B of FIGS. 1-3; however, the example process 500B is not limited to the port extender device 106B of FIGS. 1-3, e.g. the example process 500B may be performed by one or more of the port extender devices 106A,C, and/or the example process 500B may be performed by one or more components of the port extender device 106B. Further for explanatory purposes, the blocks of the example process 500B are described herein as occurring in serial, or linearly. However, multiple blocks of the example process 500B may occur in parallel. In addition, the blocks of the example process 500B may be performed in a different order than the order shown and/or one or more of the blocks of the example process 500B may not be performed.

The port extender device 106B receives an end to end flow control message from an upstream network device, such as the controlling bridge device 102A, that includes a number of the port for which upstream traffic should be flow controlled, and a priorities list (512). In one or more implementations, the end to end flow control message may further include a duration of time.

The port extender device 106B generates a PFC message based at least in part on the end to end flow control message (514). For example, the port extender device 106B may map the priorities list to a priority enable bit vector of the PFC message, and/or the port extender device 106B may map an amount of time in the end to end flow control message to a time field of the PFC message. The port extender device 106B then transmits the PFC message to the end station device 108E (516). The end station device 108E receives the PFC message and implements flow control with respect to the upstream traffic generated by the end station device 108E that is associated with one or more of the priorities in the priority enable bit vector, such as for a period of time indicated in the PFC message.

Figure 6:
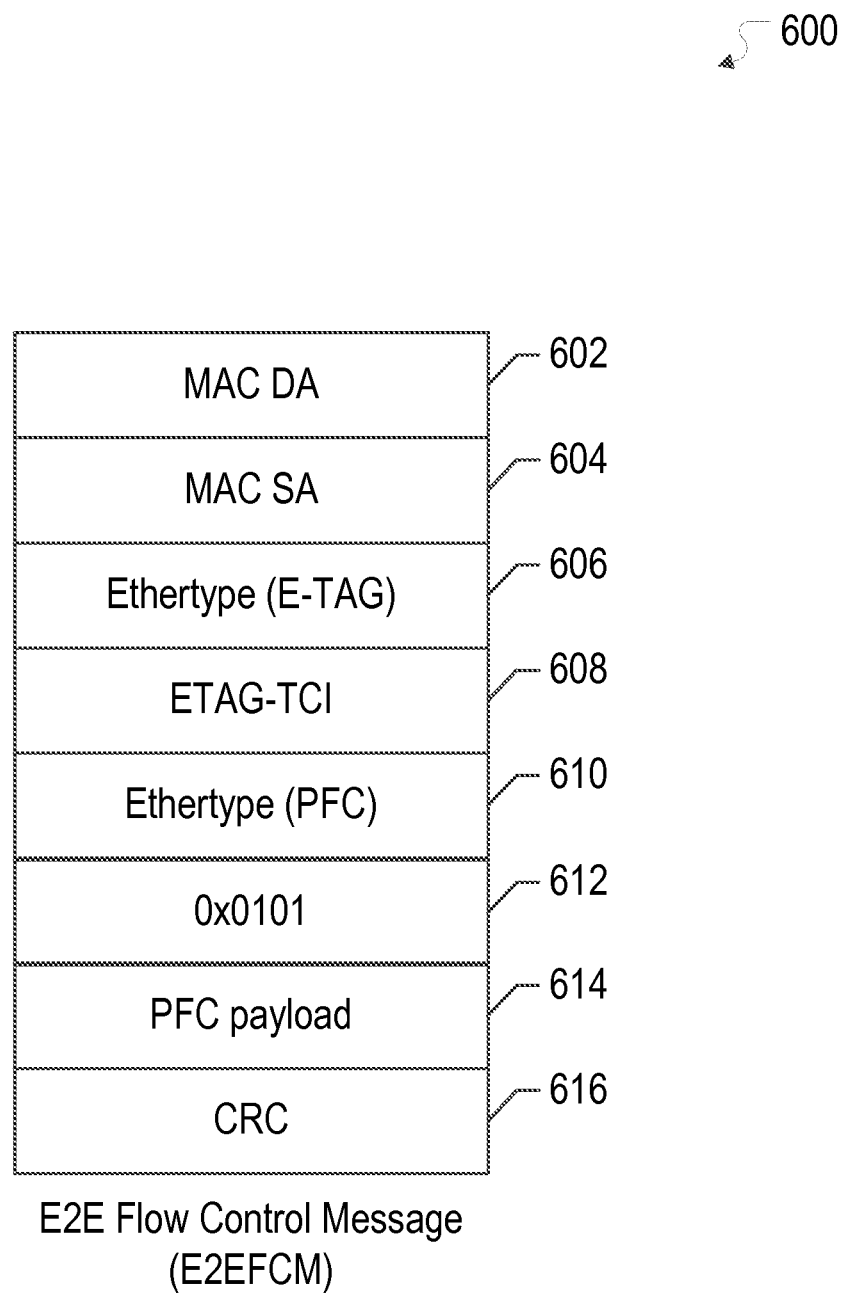
FIG. 6 illustrates an example end to end flow control message frame format in accordance with one or more implementations.

FIG. 6 illustrates an example end to end flow control message frame format 600 in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

The end to end flow control message frame format 600 includes a MAC destination address (DA) field 602, a MAC source address (SA) field 604, an Ethertype (E-TAG) field 606, an ETAG-TCI field 610, an opcode field 612 which is set to 0x0101, a PFC payload field 614, and a cyclic redundancy check (CRC) field 616.

The end to end flow control message frame format 600 may be constructed by replacing the Ethernet MAC header of a PFC message with an IEEE 802.1BR-2012 packet header. Thus, the E-TAG-TCI field 608 may be mapped to an identifier of a port (e.g. portId information). The list of priorities (e.g. priorities list) can be mapped from the 8-bit priority enable bit vector in the PFC payload field 614 (e.g. 802.1Qbb or PFC message format). The time duration can be directly mapped to and/or derived from the time field which is also in the PFC payload field 614 (e.g. 802.1Qbb or PFC message format).

Figure 7:
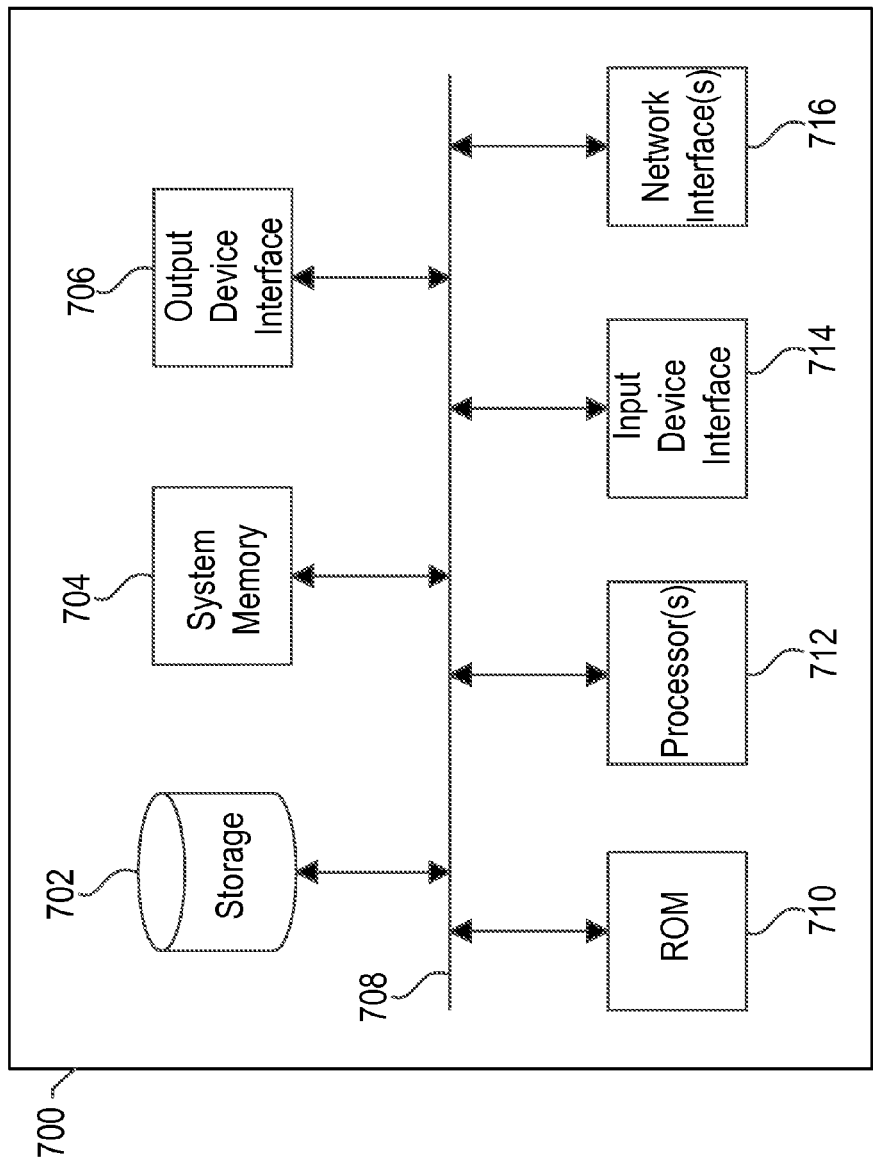
FIG. 7 conceptually illustrates an example electronic system with which one or more implementations of the subject technology can be implemented.

FIG. 7 conceptually illustrates an example electronic system 700 with which one or more implementations of the subject technology can be implemented. The electronic system 700, for example, may be, or may include, one or more of the controlling bridge devices 102A-B, the aggregate port extender device 104, the port extender devices 106A-C, and/or the end station devices 108A-H, a desktop computer, a laptop computer, a tablet device, a smartphone, and/or generally any electronic device. Such an electronic system 700 includes various types of computer readable media and interfaces for various other types of computer readable media. The electronic system 700 includes a bus 708, one or more processing unit(s) 712, a system memory 704, a read-only memory (ROM) 710, a permanent storage device 702, an input device interface 714, an output device interface 706, one or more network interface(s) 716, and/or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are utilized by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory (RAM). The system memory 704 may store one or more of the instructions and/or data that the one or more processing unit(s) 712 may utilize at runtime. In one or more implementations, the processes of the subject disclosure are stored in the system memory 704, the permanent storage device 702, and/or the ROM 710. From these various memory units, the one or more processing unit(s) 712 retrieve instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by the electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 7, bus 708 also couples electronic system 700 to one or more networks (not shown) through one or more network interface(s) 716. The one or more network interface(s) may include Bluetooth interface, a Bluetooth low energy (BLE) interface, a Zigbee interface, an Ethernet interface, a Wi-Fi interface, a MoCA interface, a reduced gigabit media independent interface (RGMII), or generally any interface for connecting to a network. In this manner, electronic system 700 can be a part of one or more networks of computers (such as a local area network (LAN), a wide area network (WAN), or an Intranet, or a network of networks, such as the Internet. Any or all components of electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, SSD, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "access point", "receiver", "computer", "server", "processor", and "memory" all refer to electronic or other technological devices. These terms exclude people or groups of people. For the purposes of the specification, the terms "display" or "displaying" means displaying on or by an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   detecting by a controlling bridge, that congestion is being experienced by at least one queue of a port;
   identifying an end station device that is generating upstream traffic being queued at the at least one queue that is at least partially causing the congestion based at least in part on the upstream traffic;
   determining, by the controlling bridge, a network device that is directly coupled to the end station device based on network topology information stored at the controlling bridge;
   determining, based on the network topology information, another port of the network device to which the end station device is connected;
   generating an end to end flow control message that comprises an identifier of the another port of the network device to which the end station device that is generating the upstream traffic is connected, a device identifier of the end station device, and an indication of at least one priority associated with the at least one queue, wherein the end to end flow control message indicates that the upstream traffic should be flow controlled by the end station device and the end to end flow control message is addressed to the network device that is directly coupled to the end station device; and
   transmitting the end to end flow control message to the network device over the port, wherein, upon receipt of the end to end flow control message by the network device, the end to end flow control message is converted into a priority flow control message that is transmitted to the end station device over the another port.

2. The method of claim 1, wherein the method further comprises:
   receiving, by the network device, the end to end flow control message;
   converting the indication of the at least one priority of the end to end flow control message into a priority enable vector of the priority flow control message; and
   transmitting the priority flow control message to the end station device over the another port.

3. The method of claim 2, further comprising:
   receiving, by the end station device, the priority flow control message; and
   performing, by the end station device, flow control on the upstream traffic associated with the at least one priority.

4. The method of claim 3, wherein performing, by the end station device, the flow control on the upstream traffic associated with the at least one priority comprises pausing or rate limiting the upstream traffic associated with the at least one priority without pausing or rate limiting other upstream traffic not associated with the at least one priority.

5. The method of claim 1, further comprising:
   estimating an amount of time to relieve the congestion; and
   generating the end to end flow control message to include the amount of time as a pause time;
   detecting, prior to an expiration of the amount of time whether the congestion is still being experienced by the at least one queue of the port; and
   transmitting another end to end flow control message to the network device when the congestion is still being experienced by the at least one queue of the port.

6. The method of claim 5, further comprising:
   receiving, by the network device, the end to end flow control message;

generating, by the network device and responsive to receiving the end to end flow control message, the priority flow control message comprising the amount of time; and transmitting the priority flow control message to the end station device.

7. The method of claim 1, wherein a source address field of the end to end flow control message comprises a first address of another network device comprising the at least one queue experiencing the congestion, and a destination address field of the end to end flow control message comprises a second address of the network device.

8. The method of claim 7, wherein the end to end flow control message is transmitted to the network device out-of-band via at least one intermediary device that forwards the end to end flow control message from the another network device to the network device without modifying the end to end flow control message.

9. The method of claim 8, wherein the another network device comprises the controlling bridge in an extended bridge architecture, the at least one intermediary device comprises an aggregate port extender device in the extended bridge architecture, the network device comprises port extender device in the extended bridge architecture, and the upstream traffic is received from the end station device by the port extender device over the another port, forwarded by the port extender device, without modifying the upstream traffic, to the aggregate port extender device, forwarded by the aggregate port extender device, without modifying the upstream traffic, to the controlling bridge device, and received by the controlling bridge device over the port.

10. A non-transitory computer-readable storage medium storing instructions, the instructions comprising:

instructions to receive, by a network device, an end to end flow control message from another network device that is experiencing congestion at one or more queues of a port, the end to end flow control message being received out-of-band via an intermediary network device that forwards the end to end flow control message without modifying the end to end flow control message, and the end to end flow control message comprising an identifier of the port and a list of priorities associated with the one or more queues of the port that are experiencing the congestion;

instructions to determine an end station device that is coupled to the port;

instructions to convert the list of priorities of the end to end flow control message into a priority enable vector of a priority flow control message, the priority enable vector indicating priorities of upstream traffic to be flow controlled, wherein the priority flow control message indicates that upstream data traffic having a priority identified in the priority enable vector should be flow controlled by the end station device, the priority flow control message being separate from the end to end flow control message; and instructions to transmit the priority flow control message in-band over the port to the end station device.

11. The non-transitory computer-readable storage medium of claim 10, wherein a source address field of the end to end flow control message comprises a first address of the another network device comprising the port and a destination address field of the end to end flow control message comprises a second address of network device.

12. The non-transitory computer-readable storage medium of claim 11, wherein the another network device comprises a controlling bridge device in an extended bridge architecture, the intermediary network device comprises an aggregate port extender in the extended bridge architecture, and the network device comprises a port extender device in the extended bridge architecture.

13. A controlling bridge device comprising:

a port; and a processor configured to:

detect that congestion is being experienced by at least one queue of the port;

identify an end station device that is generating upstream traffic being queued at the at least one queue that is at least partially causing the congestion based at least in part on the upstream traffic;

determine a network device that is directly coupled to the end station device based on network topology information stored at the controlling bridge device;

determine, based on the network topology information, another port of the network device to which the end station device is connected;

generate an end to end flow control message that comprises an identifier of the another port of the network device to which the end station device that is generating the upstream traffic is connected, a device identifier of the end station device, and an indication of at least one priority associated with the at least one queue, wherein the end to end flow control message indicates that the upstream traffic should be flow controlled by the end station device and the end to end flow control message is addressed to the network device that is directly coupled to the end station device; and transmit the end to end flow control message to the network device over the port, wherein, upon receipt of the end to end flow control message by the network device, the end to end flow control message is converted into a priority flow control message that is transmitted to the end station device over the another port.

14. The controlling bridge device of claim 13, wherein the end station device is configured to, upon receipt of the priority flow control message, perform flow control on the upstream traffic associated with the at least one priority.

15. The controlling bridge device of claim 14, the end station device is configured to pause or rate limit the upstream traffic associated with the at least one priority without pausing or rate limiting other upstream traffic not associated with the at least one priority.

16. The controlling bridge device of claim 13, wherein the processor is further configured to:

estimate an amount of time to relieve the congestion; and generate the end to end flow control message to include the amount of time as a pause time;

detect, prior to an expiration of the amount of time whether the congestion is still being experienced by the at least one queue of the port; and transmit another end to end flow control message to the network device when the congestion is still being experienced by the at least one queue of the port.

17. The controlling bridge device of claim 16, wherein the priority flow control message comprises the amount of time.

18. The controlling bridge device of claim 13, wherein a source address field of the end to end flow control message comprises a first address of the controlling bridge device comprising the port having the at least one queue experiencing the congestion, and a destination address field of the end to end flow control message comprises a second address of the network device.

19. The controlling bridge device of claim 18, wherein the end to end flow control message is transmitted to the network device out-of-band via at least one intermediary device that forwards the end to end flow control message from the controlling bridge device to the network device without modifying the end to end flow control message.

20. The controlling bridge device of claim 19, wherein the at least one intermediary device comprises an aggregate port extender device in an extended bridge architecture, the network device comprises port extender device in the extended bridge architecture, and the upstream traffic is received from the end station device by the port extender device over the another port, forwarded by the port extender device, without modifying the upstream traffic, to the aggregate port extender device, forwarded by the aggregate port extender device, without modifying the upstream traffic, to the controlling bridge device, and received by the controlling bridge device over the port.

\* \* \* \* \*